(12) United States Patent
Scheider et al.

(10) Patent No.: US 8,948,923 B2
(45) Date of Patent: Feb. 3, 2015

(54) INTERFACE IN A VEHICLE AND METHOD FOR EXCHANGING DATA

(75) Inventors: Wolf-Henning Scheider, Leonberg (DE); Werner Poechmueller, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1543 days.

(21) Appl. No.: 12/531,306

(22) PCT Filed: Feb. 5, 2008

(86) PCT No.: PCT/EP2008/051411
§ 371 (c)(1),
(2), (4) Date: Jan. 5, 2011

(87) PCT Pub. No.: WO2008/110413
PCT Pub. Date: Sep. 18, 2008

(65) Prior Publication Data
US 2011/0106333 A1 May 5, 2011

(30) Foreign Application Priority Data

Mar. 14, 2007 (DE) .......................... 10 2007 012 304

(51) Int. Cl.
*G01M 17/00* (2006.01)
*H04L 12/66* (2006.01)
*H04L 29/08* (2006.01)
*H04L 29/06* (2006.01)

(52) U.S. Cl.
CPC ............... *H04L 12/66* (2013.01); *H04L 67/12* (2013.01); *H04L 69/08* (2013.01)
USPC ............ 701/1; 701/29.1; 701/29.6; 701/31.5; 701/33.2; 370/241; 370/395.5

(58) Field of Classification Search
None
See application file for complete search history.

(56) References Cited

U.S. PATENT DOCUMENTS

| 5,732,074 | A  | * | 3/1998  | Spaur et al. ................... 370/313 |
| 6,430,164 | B1 | * | 8/2002  | Jones et al. ................... 370/313 |
| 6,563,418 | B1 |   | 5/2003  | Moon |
| 6,629,029 | B1 | * | 9/2003  | Giles ........................... 701/31.4 |
| 6,718,425 | B1 | * | 4/2004  | Pajakowski et al. .......... 710/315 |
| 6,803,854 | B1 | * | 10/2004 | Adams et al. ................. 340/531 |
| 6,816,760 | B1 | * | 11/2004 | Namaky ....................... 701/33.2 |
| 6,864,788 | B2 | * | 3/2005  | Crawford et al. ............. 340/531 |
| 7,418,481 | B2 | * | 8/2008  | Fredriksson ................. 709/217 |
| 7,453,904 | B2 | * | 11/2008 | Seto ............................. 370/466 |
| 7,505,837 | B2 | * | 3/2009  | Somos ......................... 701/33.9 |
| 7,516,244 | B2 | * | 4/2009  | Kelly et al. ................... 709/249 |
| 7,522,979 | B2 | * | 4/2009  | Pillar ........................... 701/32.8 |
| 7,532,640 | B2 | * | 5/2009  | Kelly et al. ................... 370/466 |
| 7,599,377 | B2 | * | 10/2009 | Jordan et al. ................. 370/400 |

(Continued)

FOREIGN PATENT DOCUMENTS

DE 101 20 465 A1 11/2002
DE 102 37 715 2/2004

*Primary Examiner* — Jonathan M Dager
(74) *Attorney, Agent, or Firm* — Kenyon & Kenyon LLP

(57) ABSTRACT

A method and system provide an interface in a vehicle for connecting to a mobile computing device for exchanging data between the interface and the mobile computing device, the interface being connected to a vehicle data bus for exchanging data with at least one vehicle system. The data exchange between the mobile computing device and the interface occurs according to a first data protocol and the data exchange between the interface and the at least one vehicle system occurs according to a second data protocol that differs from the first data protocol.

14 Claims, 2 Drawing Sheets

(56) References Cited

U.S. PATENT DOCUMENTS

| | | | |
|---|---|---|---|
| 7,630,834 B2 * | 12/2009 | Klausner et al. | 701/472 |
| 7,983,820 B2 * | 7/2011 | Kelly et al. | 701/50 |
| 8,214,102 B2 * | 7/2012 | Donovan et al. | 701/31.4 |
| 2002/0006139 A1 * | 1/2002 | Kikkawa et al. | 370/502 |
| 2002/0105968 A1 * | 8/2002 | Pruzan et al. | 370/465 |
| 2002/0110146 A1 * | 8/2002 | Thayer et al. | 370/465 |
| 2002/0181405 A1 * | 12/2002 | Ying | 370/245 |
| 2002/0197955 A1 * | 12/2002 | Witkowski et al. | 455/41 |
| 2003/0065432 A1 * | 4/2003 | Shuman et al. | 701/48 |
| 2003/0105566 A1 * | 6/2003 | Miller | 701/33 |
| 2004/0111722 A1 * | 6/2004 | Horst et al. | 717/168 |
| 2004/0230356 A1 * | 11/2004 | Namaky | 701/29 |
| 2004/0257208 A1 * | 12/2004 | Huang et al. | 340/426.1 |
| 2005/0065678 A1 * | 3/2005 | Smith et al. | 701/29 |
| 2005/0090940 A1 * | 4/2005 | Pajakowski et al. | 701/1 |
| 2005/0130723 A1 * | 6/2005 | Grivas et al. | 455/575.9 |
| 2005/0251604 A1 * | 11/2005 | Gerig | 710/120 |
| 2006/0041348 A1 * | 2/2006 | Liebl et al. | 701/35 |
| 2006/0041349 A1 * | 2/2006 | Chinnadurai et al. | 701/35 |
| 2006/0213731 A1 * | 9/2006 | Lesesky et al. | 188/158 |
| 2006/0217855 A1 * | 9/2006 | Chinnadurai et al. | 701/29 |
| 2007/0083304 A1 * | 4/2007 | Yamada | 701/29 |
| 2007/0086482 A1 * | 4/2007 | Pruzan et al. | 370/466 |
| 2008/0065239 A1 * | 3/2008 | Leinfellner et al. | 700/34 |
| 2008/0071439 A1 * | 3/2008 | Bertosa et al. | 701/29 |
| 2008/0214022 A1 * | 9/2008 | Kowalick | 439/34 |
| 2008/0218323 A1 * | 9/2008 | Lesesky et al. | 340/431 |
| 2009/0265057 A1 * | 10/2009 | Chinnadurai et al. | 701/29 |
| 2010/0070748 A1 * | 3/2010 | Duan et al. | 713/2 |
| 2011/0015822 A1 * | 1/2011 | Liebl et al. | 701/33 |

* cited by examiner

INTERFACE IN A VEHICLE AND METHOD FOR EXCHANGING DATA

FIELD OF INVENTION

The present invention relates to a method and system concerning an interface for exchanging data.

BACKGROUND INFORMATION

German patent reference no. DE 101 20 465 A1 describes a device for displaying and controlling vehicle functions in a vehicle and a mount for a device and a bus system for this purpose. In the application, it appears that a module includes a display and/or operating unit, and a computer, the computer being designed to communicate with other vehicle units. The module forms an independent unit having a power source, which may be operated on an adapter-like mount provided in the vehicle. The module is removable from the mount. In the removed state, it is operable as an stand-along computer. The module is designed to communicate with a vehicle bus. For security reasons, the bus connection is not provided directly on the module, but is rather implemented in mount. The signals of the data buses are converted via the mount, the module may be equipped with simple connectors.

SUMMARY ON THE INVENTION

Embodiments of the present invention provide a method and system concerning an interface in which an exchange of data between the mobile computing device and the interface and between the interface and the vehicle data bus occurs according to different bus systems. Thus, it is not necessary for the mobile computing device itself to communicate directly with the vehicle data bus. This provides, among other things, a mechanical simplification of a connection between a mobile computing device and a vehicle system, and a simplification of the data traffic between the mobile computing device and the vehicle system. In embodiments of the present invention, because a different data bus protocol may be used between the interface and the mobile computing device than in the vehicle, it is possible to implement a simplified data protocol between the interface and the mobile computing device instead of the data bus systems having high data transmission rates and high redundancies that are often required in the vehicle. In embodiments of the present invention, the requirements for the security relevance for this data bus protocol are simplified. For example, an appropriate conversion to a data protocol of the vehicle system in the interface is able to ensure that no incorrect and harmful data are transmitted from the mobile computing device into the vehicle system. Beyond a mere filtering and conversion of the data, the security of a data transmission to a vehicle system and conversely from the vehicle system to the mobile computing device may thus be increased. For example, the costs for providing a data protocol in the mobile computing device may be reduced since it is not necessary for the mobile computing device itself to be capable of communicating with the vehicle data bus.

Embodiments of the present invention provide for transmitting both data and instructions between the mobile computing device and the vehicle. For example, this makes it possible to control the mobile computing device from the vehicle, and this makes it possible to control vehicle functions comfortably from the mobile computing device in the vehicle. For example, because of the mobility of the mobile computing device in the vehicle, controlling a vehicle function is not limited to the person driving. Embodiments of the present invention provide for transmitting information both from the mobile computing device to the vehicle and vice versa. Updated operating data, for example, for a navigation system, may be transmitted from the mobile computing device to the vehicle. For example, it is possible to display vehicle data via a display of the mobile computing device or to store them so as to implement a logbook function.

Embodiments of the present invention provide for an administrative unit for regulating access conflicts in the event that an instruction given by the mobile computing device conflicts with an instruction present in the vehicle system. In embodiments of the present invention, the vehicle system has additional operating elements of its own, via which instructions may be input that are possibly contrary to a control input via the mobile computing device. For example, the instruction for opening a sliding sunroof, which is given via a control element in the vehicle, cannot be executed at the same time as an instruction for closing the same sliding sunroof given via the mobile computing device. For example, to avoid errors in the vehicle system, an instruction is transmitted from the interface to the vehicle system only when it is determined that this instruction does not conflict with an already existing instruction that is given approximately simultaneously. If indicated, the instructions given via the vehicle control elements may be given priority.

Embodiments of the present invention provide for an identification unit in the interface for outputting an identification of the vehicle system to the mobile computing device so that the mobile computing device may display for example an operating menu corresponding to the respective vehicle system or may provide program code associated with the vehicle system with which the mobile computing unit communicates. For example, this obviates a user first having to set the mobile computing device to operate his vehicle. In embodiments of the present invention, the identification may also be used to select an applicable data protocol on the part of the mobile computing device for a communication.

Embodiments of the present invention provide for implementing the link between the mobile computing unit and the interface by a wireless interface since this makes it possible to connect the mobile computing device to the interface in a simpler, more convenient and more freely mobile manner in the vehicle.

Embodiments of the present invention provide a mechanical mount for mounting the mobile computing device on the interface. For example, this ensures a secure mount of the mobile computing device in the vehicle. For example, this allows for a wire-bound link between the mobile computing device and the interface to be implemented in a simple manner.

Embodiments of the present invention provide an electrical connector on the interface for transmitting a supply voltage to the mobile computing device since a respective connector allows either for the mobile computing unit to be supplied with power or at least for an energy store of the mobile computing device to be charged in a simple manner.

Embodiments of the present invention provide for a memory unit in the interface, in which program code is stored for performing a data exchange between the memory unit and the mobile computing device for multiple different data protocols. In an embodiment, depending on the computing unit used, a corresponding data protocol is selected and used for the data exchange.

Embodiments of the present invention provide for a memory device in the interface, in which driver information for controlling at least one vehicle function is stored for the mobile computing device. For example, it is possible to connect a computing device to the interface for controlling a vehicle system, which itself does not contain any information about vehicle functions to be controlled. The respective driver information is loaded from the memory of the interface and transmitted to the mobile computing device. It is then possible to control a respective function of the vehicle system from the mobile computing device.

Embodiments of the present invention provide for, with respect to a data exchange between the interface, the vehicle system and the mobile computing device. In embodiments of the present invention, a mobile telephone link is established between the vehicle system and a data network situated outside of the vehicle, for example. the Internet, via a mobile telephone interface that is situated on the mobile computing device. For example, it is possible to utilize the easily implemented connection of the mobile computing device via the interface to the vehicle system for connecting to the data network. In embodiments of the present invention, vehicle data may thus be transmitted to the outside. For example, vehicle state data may be transmitted to a garage. In embodiments of the present invention, it is possible to transmit updated control unit programs or maintenance programs for the vehicle system via the data network to the vehicle. For example, for this purpose, the mobile telephone interface of the mobile computing device is connected in a simple manner via the interface to the respective vehicle system.

BRIEF DESCRIPTION OF THE DRAWINGS

Exemplary embodiments of the present invention are depicted in the drawing and described in greater detail in the description below.

DETAILED DESCRIPTION

Figure 1:
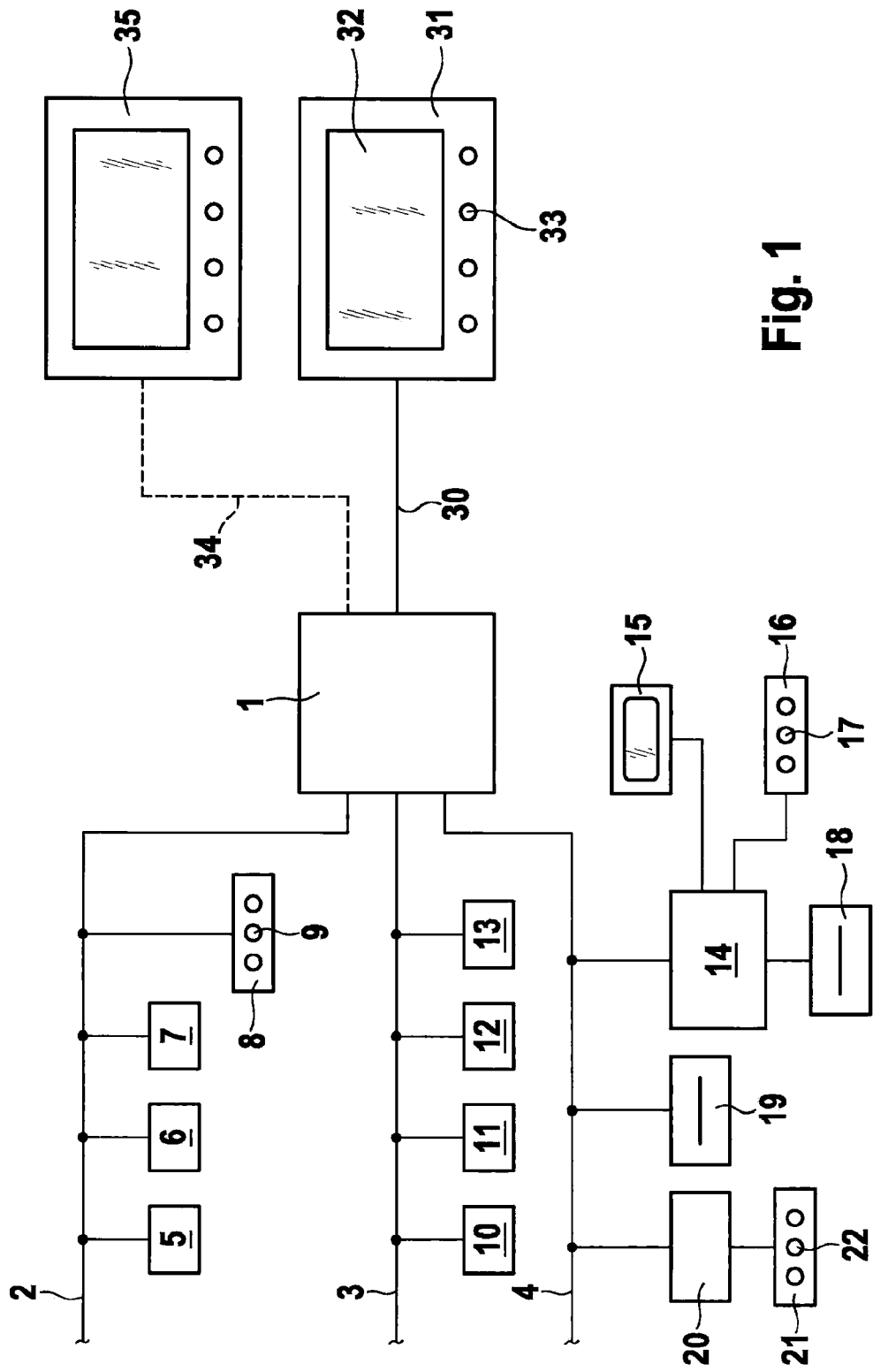
FIG. 1 shows an exemplary embodiment of an interface according to the present invention having vehicle data buses connected to it and a mobile computing device connected to the interface.

FIG. 1 shows an interface 1 according to the present invention which is connected to three vehicle data buses. In embodiments of the present invention, it is also possible to connect only one vehicle data bus, two vehicle data buses, or also multiple vehicle data buses to interface 1. In embodiments of the present invention a LIN bus (local interconnect network), a CAN bus 3 (controller area network) and an optical bus 4 (for example a MOST bus) are connected to interface 1.

A first actuator 5 for controlling a driver seat, a second actuator 6 for controlling a window of the vehicle and a third actuator 7 for controlling an air conditioning system of the vehicle are connected to LIN bus 2. For example, an operating unit 8 having operating elements 9 for controlling the actuators 5, 6, 7 connected to LIN bus 2 is connected to LIN bus 2. A speed measuring unit 10, a revolution meter 11, a steering angle sensor 12 and a braking assistant 13 are connected to CAN bus 3. A navigation device 14 is connected to optical data bus 4, which preferably has a display 15 and an operating unit 16 having operating elements 17. In embodiments of the present invention, a data carrier drive 18 is connected to navigation unit 14 for supplying navigation data to navigation device 14. Furthermore, another data carrier drive 19 is connected to the optical data bus. Via data carrier drive 19, images or films for example, which are stored on the data carrier in data carrier drive 19, may be transmitted via optical data bus 4 to display 15 of navigation unit 14 to be displayed on display 15. For example, a radio device 20 for receiving a radio program is connected to optical data bus 4. Radio device 20 is connected to an operating unit 21 having operating elements 22 for controlling radio device 20 for selecting a station, for selecting a piece of music stored on data carrier 19 or for setting the volume. In embodiments of the present invention, interface 1 is connected via a link 30 to a mobile computing device 31. The mobile computing device 31 has a display 32 as well as operating elements 33. Alternatively or additionally, display 32 is implemented as a so-called touch screen display, in which input occurs by touching the touch-sensitive display face of display 32. Link 30 may be executed in a wire-bound manner, but may also be implemented as a wireless link. Thus it is possible, for example, for link 30 to be implemented as a so-called Bluetooth link. Alternatively, the wireless link may also be implemented via an infrared interface or a wireless LAN interface.

A data exchange between mobile computing device 31 and interface 1 occurs in accordance with a first data protocol independently of the implementation of the link. Thus, for example, link 30 can be implemented as a serial interface so as to use a data protocol customary for so-called USB links (universal serial bus). In embodiments of the present invention, the first data protocol may be implemented as an ISTSI, Firewire or eSATA link. In embodiments, data protocols suitable for mobile computing devices, for example, so-called laptops or PDAs, are used.

In embodiments of the present invention, interface 1 converts information or instructions received from mobile computing device 31 in such a way that it first ascertains to which data bus in the vehicle the information to be transmitted or the instruction to be transmitted should be relayed, in the event that multiple data buses are connected to interface 1 on the vehicle side. Once the respective data bus is ascertained, then the relevant information or the instruction, which is received from the mobile computing device first in the respective data protocol transmitted by mobile computing device 31, is converted into an instruction, which is compatible to the respective vehicle system and which is now converted into the data protocol of the respective data bus. For example, it is not necessary for mobile computing device 31 to have information about the identity of the vehicle data bus to which the respective vehicle system that is to be operated by mobile computing device 31 is connected. This information is instead provided by interface 1. The respective information or the instruction is now transmitted to the corresponding vehicle system. Thus, it is possible, for example, to control actuator 5 of the driver seat. For example, a profile of the driver is stored in mobile computing device 31 such that when establishing a link 30 a corresponding instruction is output to actuator 5 of the driver seat and the driver seat is adjusted to the position that suits the respective driver. As an alternative to using operating elements 8, one can open a window or the sliding sunroof or adjust the air conditioning system via mobile computing device 31. In embodiments of the present invention, such an adjustment is possible, e.g., when the mobile computing device is used by a passenger in the back of the vehicle, the passenger or other person able to make adjustments in accordance with his ideas without having access to operating elements 9, which are usually situated in the region of an instrument panel of the vehicle. In an embodiment, in a corresponding manner, it is possible to control car radio 20 or navigation device 14.

In embodiments of the present invention, for example, route information, which was already calculated previously by mobile computing device 31, such as a previously entered travel destination, is transmitted directly to navigation system 14 via interface 1. In embodiments, information or instructions may be transmitted from the vehicle systems to mobile computing device 31. If interface 1 determines that it is connected to a mobile computing device 31, then it ascertains from the data transmitted to it or running through it on the individual data buses 2, 3, 4, which information or instructions are relevant for mobile computing device 31. For example, it may receive the instruction to store a certain vehicle setting such as a seat setting. This profile may also be transmitted to mobile computing device 31 or be stored in a memory of mobile computing device 31. In embodiments, an instruction to determine a route to a travel destination may also be transmitted to mobile computing device 31 such that after leaving the vehicle and taking the mobile computing device out of the vehicle the route to the travel destination, which is possibly not directly reachable by vehicle, may be followed directly. In embodiments of the present invention, information about the vehicle such as the speed, the activation of the engine, or the route traveled, may be transmitted to mobile computing device 31 and displayed on display 32. In embodiments, it is possible to store this information in the mobile computing device 31 in a kind of logbook mode.

In embodiments of the present invention, interface 1 is not limited to establishing one link 30 to a mobile computing device, but rather it is possible to establish additional links 34 to one or several additional computing devices 35.

Figure 2:
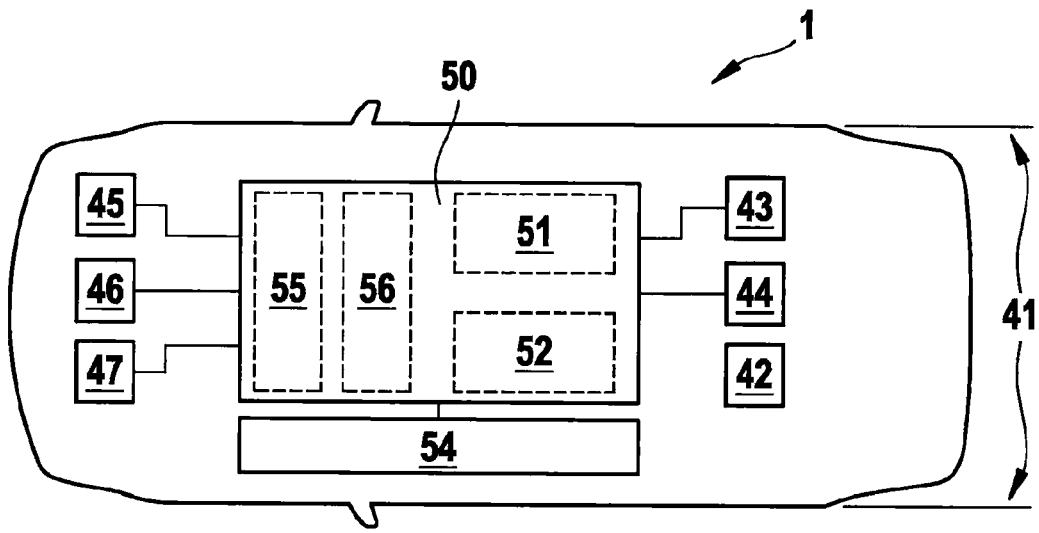
FIG. 2 shows an exemplary embodiment for an interface according to the present invention.

FIG. 2 shows in detail an exemplary embodiment for an interface according to the present invention. In this instance, interface 1 is integrated into an instrument panel of the vehicle and in embodiments, has a mechanical mounting or snap-in device 41, via which a mobile computing device may be mechanically connected to interface 1. In embodiments, snap-in device 41 may be situated in the vehicle spatially removed from interface 1. In the embodiment shown, snap-in connection 41 borders directly on interface 1. In this instance, connectors are situated in the region of mounting connection 41 in such a way that a contact to the mobile computing device is established when the mobile computing device is mechanically inserted into mounting device 41. In embodiments, a wire connection is established via an electrical connector 42, via which a supply voltage is transmitted to mobile computing device 31. In embodiments, this charges a separate power supply of mobile computing device 31. In embodiments of the present invention, a plug connector 43 is provided for establishing a wire-bound data connection to a mobile computing device. In embodiments, an appropriate wireless interface 44 is provided on interface 1 for establishing a wireless connection.

On the vehicle side, FIG. 2 respectively shows interfaces to the individual data buses 45, 46, 47 corresponding to connectors to the LIN bus, the CAN bus and the optical data bus as shown in FIG. 1. All vehicle data bus links and also links 34, 44 to the mobile computing device are connected to a computing unit 50 which regulates the data traffic between the vehicle systems and the mobile computing device. Computing unit 50 has a first software module 51, which converts the data received from the mobile computing device in accordance with the first data protocol into the corresponding data protocol of the vehicle data bus. In embodiments, alternatively or additionally, a second software module 52 is provided, which converts data provided by the vehicle systems via the vehicle data bus in the second data protocol into data in accordance with the first data bus protocol for transmission to the mobile computing device. In embodiments, additional software modules is stored in memory device 54, which may be loaded both on the vehicle side and on the side of the mobile computing device when other data protocols are desired so as to ensure the conversion between a first and another second data bus protocol. In embodiments, another software module 55 is provided in computing unit 50 which is to prevent harmful or interfering data from being transmitted to the vehicle system. Software module 55 thereby assumes a firewall function so as in particular to check the integrity of the data transmitted to the vehicle system and to prevent the transmission of instructions that are interfering or harmful for a vehicle system.

Embodiments of the present invention provide an additional software module 56 which, in the event of an access conflict, provides an interference-free solution to the access conflict. An access conflict exists when different or mutually contradictory instructions are given for a vehicle system on a respective data bus to which the vehicle system is connected.

Such an access conflict may exist, for example, if several computing units 31, 35 transmit different instructions to the vehicle system. Furthermore, an access conflict is also possible if an instruction input via the operating element of the vehicle system differs from an instruction input via the operating element of mobile computing device 31. In this case, an access conflict is resolved either in that a desired action is not executed or that one operating device, for example, the operating elements of the vehicle system, is given priority over other operating elements, for example an operating element of mobile computing device 31.

In embodiments of the present invention, memory device 54 stores identification data which may be transmitted to mobile computing device 31 via connector 43 or 44. This makes it possible to tell mobile computing device 31 what vehicle system is present, what functions are available and what information may be retrieved. In embodiments, an identification may be transmitted not only about the type of vehicle, but also about the particular vehicle specimen, for example, the frame identification number or a registration. This allows for a clear identification of the vehicle itself when recording logbook data.

In embodiments of the present invention, driver information, for example, the graphical descriptions of operating menus and/or the sequence of operating functions may also be transmitted from interface 1 to mobile computing device 31. The respective operating menus may then be displayed on a display 32 for selection by a user. Other software components such as, for example, operating instructions for vehicle systems may be stored as well and transmitted to the mobile computing device.

Figure 3:
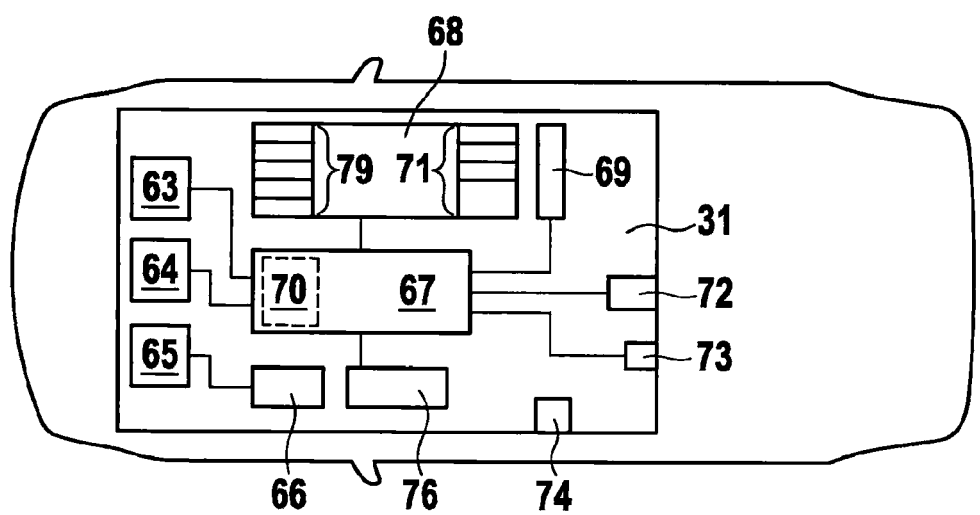
FIG. 3 shows an exemplary embodiment for a mobile computing device for connection to the interface according to the present invention.

FIG. 3 shows an exemplary embodiment for a mobile computing device 31 that is connected to an interface 1 according to the present invention. In embodiments, alternatively or jointly, mobile computing device 31 has a wire-bound data connector 63, a wireless interface 64 and/or a power supply connector 65. In embodiments, when implementing a USB interface, one can combine the wire-bound data transmission with a power supply. In embodiments, an accumulator 66 for providing a voltage supply located in mobile computing device 31 is charged via power supply connector 65. Data connectors 63, 64 are connected to a computing unit 67 of the mobile computing device. In embodiments, computing unit 67 controls a display unit 68 which is implemented as a touch screen. A unit 69 for detecting a screen contact is also connected to computing unit 67. Display 68 may display control menus 69 for controlling functions of the vehicle systems, for example. In embodiments of a software module 70, the respective control instructions are transmitted from interface 1 to mobile computing device 31 and are stored by computing unit 67. Accordingly, such menus may also be loaded from a memory unit 76 of the mobile computing device. Transmitted vehicle data are either directly output on display 68 or may be selected via a menu selection 71.

In embodiments of the present invention, mobile computing device 31 has a mobile telephone interface 72, via which a link may be established from mobile computing device 31 to a mobile telephone network. For example, the link to a mobile telephone network allows for a link to a data network outside of the vehicle, for example, to the Internet. Via the thus implemented Internet link, it is possible to transmit data from a vehicle system via interface 1 and mobile computing device 31 to the data network and vice versa. In embodiments, this allows for a remote diagnosis of the vehicle, and for remote maintenance in which updated operating data of the vehicle may be transmitted to the vehicle.

In embodiments of the present invention, mobile computing device 31 has an audio output 73. In embodiments, this makes it possible to output audio data, for example, from radio 20 or from data carrier 19 via interface 1 to the mobile computing device for output via audio interface 73. It is thus possible to connect, for example, headphones to the audio interface so as to make it possible to listen to music or follow a radio program via the mobile computing device, which is received by the vehicle system and converted by an appropriate conversion of the data bus protocol from the optical data bus to the data link to mobile computing unit 31.

In embodiments, operator interfaces for different vehicle systems or even for different vehicles may also be stored in memory 76.

In embodiments of the present invention, a digital navigation map is transmitted from the navigation device to the mobile computing device. For example, computing unit 67 may thus continue a route support, even after a removal from the vehicle. In embodiments, supplemental information such as for example telephone book data, data from so-called POIs (points of interest) and travel guide data may be transmitted to the mobile computing device so that the driver may use these outside of the vehicle.

In embodiments of the present invention, data about the tank fuel level, the route traveled, the average fuel consumption or the wear of the brake pads and brake linings may be transmitted from the vehicle systems to the mobile computing device via the CAN bus.

In embodiments of the present invention, mobile computing device 31 may also have a card reader 74 for supplying data via a data carrier card, for example, an SD or MMC card. The data thus provided may now also be transmitted to a vehicle system via interface 1.

What is claimed is:

1. An interface in a vehicle for connecting to a mobile computing device for exchanging data between the interface and the mobile computing device, comprising:
   an administrative unit that is connected to a vehicle data bus for exchanging data by the interface with at least one vehicle system,
   wherein:
      the exchange of data between the mobile computing device and the interface occurs according to a first data protocol and the exchange of data between the interface and the at least one vehicle system occurs according to a second data protocol that differs from the first data protocol; and
   the administrative unit is configured to:
      receive at least one instruction from the mobile computing device and at least one instruction from the at least one vehicle system for invoking a function of the vehicle;
      determine whether the at least one instruction from the mobile computing device is for executing the function in a manner that conflicts with the at least one instruction from the at least one vehicle system; and
      in response to a determined conflict, determine which of the instructions to execute.

2. The interface as recited in claim 1, wherein the interface is designed to transmit instructions and/or information from the vehicle to the mobile computing device and/or to transmit instructions and/or information from the mobile computing device to the vehicle.

3. The interface as recited in claim 1, further comprising: an identification unit for outputting an identification of the vehicle system to the mobile computing device.

4. The interface as recited in claim 1, further comprising: a wireless interface for establishing a wireless link to the mobile computing device.

5. The interface as recited in claim 1, further comprising: a mechanical mount for attaching the mobile computing device.

6. The interface as recited in claim 1, further comprising: an electrical connector for transmitting a supply voltage to the mobile computing device.

7. The interface as recited in claim 1, further comprising: a memory unit for storing program code for performing a data exchange between the interface and the mobile computing device using a data protocol.

8. The interface as recited in claim 1, further comprising a memory unit for storing and transmitting driver information for controlling at least one vehicle function for the mobile computing device.

9. A method for exchanging data between a mobile computing device and a vehicle system via an interface between the mobile computing device and a vehicle data bus, comprising:
   performing, by a processor, the exchange of data between the mobile computing device and the interface according to a first data protocol;
   performing, by the processor, the exchange of data between the interface and the at least one vehicle system according to a second data protocol that differs from the first data protocol.
   receiving, by the processor, at least one instruction from the mobile computing device and at least one instruction from the at least one vehicle system for invoking a function of the vehicle,
   determining, by the processor, whether the at least one instruction from the mobile computing device is for executing the function in a manner that conflicts with the at least one instrution from the at least one vehicle system; and
   in response to a determined conflict, determining, by the processor, which of the instructions to execute.

10. The method as recited in claim 9, wherein the vehicle system is connected to a data network outside of the vehicle via the interface in such a way that a mobile telephone link to the data network is established via a mobile telephone interface of the mobile computing device.

11. The interface as recited in claim 1, further comprising: a mechanical mount for attaching the mobile computing device in a region of the instrument panel of the vehicle.

12. A method for exchanging data, comprising:
performing, by a processor, the following:
- exchanging data between the Internet and a mobile computing device via a first interface; and
- exchanging the data between the mobile computing device and a vehicle system by (a) exchanging the data between the mobile computing device and a second interface according to a first data protocol, and (b) exchanging the data between the second interface and a vehicle data bus of the vehicle system according to a second data protocol that differs from the first data protocol;
- determining whether an instruction from the Internet is for executing a function in a manner that conflicts with an instruction from the vehicle system; and
- in response to a determined conflict, determining which of the instructions to execute.

13. The method of claim 12, wherein the mobile computing device includes a firewall module configured to prevent harmful or interfering data from being transmitted to the vehicle.

14. The method of claim 13, wherein the vehicle is one of remotely diagnosed and remotely maintained via the first and second interfaces.

* * * * *